(12) United States Patent
Morita et al.

(10) Patent No.: US 6,238,745 B1
(45) Date of Patent: May 29, 2001

(54) WATER REPELLENT FOR TREATING SOLIDS

(75) Inventors: Yoshitsugu Morita; Takayuki Aso; Haruhiko Furukawa, all of Chiba Prefecture (JP)

(73) Assignee: Dow Corning Toray Silicone Co. Ltd., Tokyo (JP)

( * ) Notice: Subject to any disclaimer, the term of this patent is extended or adjusted under 35 U.S.C. 154(b) by 0 days.

(21) Appl. No.: 09/448,530

(22) Filed: Nov. 23, 1999

(30) Foreign Application Priority Data

Dec. 22, 1998 (JP) .................................................. 10-364775

(51) Int. Cl.$^7$ ..................................................... B32B 27/30
(52) U.S. Cl. .................. 427/387; 8/DIG. 1; 106/287.16; 528/25; 528/32; 526/279; 525/100
(58) Field of Search ..................... 8/DIG. 1; 106/287.16; 427/387; 528/25, 32

(56) References Cited

U.S. PATENT DOCUMENTS 5,576,096 * 11/1996 Ono et al. .

FOREIGN PATENT DOCUMENTS

| 0 963 751 | 12/1999 | (EP) . |
| 76009440 | 3/1976 | (JP) . |
| 78004158 | 2/1978 | (JP) . |
| 11-001530 | 1/1999 | (JP) . |
| 11-1485 * | 1/1999 | (JP) . |

* cited by examiner

*Primary Examiner*—Robert Dawson
*Assistant Examiner*—Marc S. Zimmer
(74) *Attorney, Agent, or Firm*—Robert L. McKellar

(57) ABSTRACT

A water repellent for treating solids provides an durable and robust water repellency. The active ingredient in the water repellent is a pendant carbosiloxane dendrimer-functional vinyl-type polymer. A spray-formulated water repellent for treating solids contains 0.5 to 20 weight % of the pendant carbosiloxane dendrimer-functional vinyl-type polymer, 30 to 98.5 weight % of an organic solvent, and 1 to 50 weight % of a propellant gas.

12 Claims, No Drawings

WATER REPELLENT FOR TREATING SOLIDS

FIELD OF THE INVENTION

This invention relates to a water repellent for treating solids (hereinafter referred to simply as a water repellent) and more particularly relates to a water repellent capable of imparting a durable and robust water repellency to solid materials.

BACKGROUND OF THE INVENTION

Within the sphere of the silicone water repellents used on fibers and fiber-based products, Japanese Published Patent Application (Kokoku or Examined) Numbers Sho 51-9440 (9,440/1976) and Sho 53-4158 (4,158/1978) teach silicone water repellents comprising methylhydrogenpolysiloxane, an aromatic or aliphatic hydrocarbon solvent (e.g., toluene, xylene, n-hexane, n-heptane), and a curing catalyst such as a platinum compound or an organotin compound. However, these silicone water repellents require heating at temperatures from 100 to 180° C., which has a negative influence on production costs and which also limits the types of fibers and fiber-based products to which these water repellents can be applied.

In addition, fluoropolymers are known to have the ability to impart water repellency and staining resistance to solids and as a result are also frequently used in, for example, the leather and building material sectors and as surface treatment processing agents. These fluoropolymers are the polymers of a perfluoro group-functional or fluoroalkyl-functional polymerizable monomer or the copolymer of such a monomer with another polymerizable monomer.

When treating a solid such as a fiber-based product, leather, or building materials to impart water repellency thereto, the consuming public desires spray formulations to facilitate the application process. However, the efficient generation of water repellency by a spray process imposes various limitations on the composition of the water repellent.

Thus, the following prerequisites must be met: (1) the base or active ingredient of the water repellent must have an excellent affinity or compatibility with the propellant gas; (2) the base or active ingredient of the water repellent must dissolve in a homogeneous manner in the solvent in the water repellent; and (3) the water repellent, when sprayed on a solid, must readily wet the surface of the solid and must have a suitable infiltrability into the solid. When these conditions are satisfied, a uniform spray and an excellent water repellency and staining resistance are produced without the generation of powder ejection, fluffing, or whitening.

The consuming public also considers it of crucial import that spray-formulated water repellents be usable with a high level of safety and without the appearance of unpleasant odor. As far as these issues are concerned, the fluoropolymers referenced above are insoluble in low-toxicity alcohols such as ethanol, and the organic solvent used to dissolve the fluoropolymers must therefore be selected from among solvents such as ketones, e.g., acetone or methyl ethyl ketone, esters such as ethyl acetate, aliphatic hydrocarbons such as n-hexane and n-heptane, aromatic hydrocarbons such as toluene and xylene, and chlorinated hydrocarbons such as 1,1,1-trichloroethane and trichloroethylene.

Unfortunately, almost all of these solvents fail to satisfy any of the preceding prerequisites (1) to (3). In actuality the only solvent that can be used for the fluoropolymers is 1,1,1-trichloroethane. This solvent has, however, been implicated as a cause of depletion of the atmospheric ozone layer and its use is being increasingly restricted for purposes of global environmental protection. Thus, investigations have been carried out in pursuit of a solvent for the fluoropolymers that could replace 1,1,1-trichloroethane, but at present acceptable results have yet to be obtained.

The object of this invention is to provide a water repellent for treating solids that has the ability to impart a highly durable and robust water repellency to solids.

SUMMARY OF THE INVENTION

Vinyl-type polymers having a carbosiloxane dendrimer structure in side chain or pendant position ("pendant carbosiloxane dendrimer-functional vinyl-type polymers") not only provide an excellent performance in terms of water repellency and staining resistance, but are also extremely favorable from the perspective of solving the above-referenced environmental problem because such copolymers are soluble in organic solvent composed mainly of an alcohol.

DETAILED DESCRIPTION OF THE INVENTION

This invention relates to a water repellent for treating solids whose base or active ingredient is a pendant carbosiloxane dendrimer-functional vinyl-type polymer. This invention further relates to a spray-formulated water repellent for treating solids that comprises 0.5 to 20 weight % pendant carbosiloxane dendrimer-functional vinyl-type polymer, 30 to 98.5 weight % organic solvent, and 1 to 50 weight % propellant gas.

The base or active ingredient in the water repellent of the invention is a pendant carbosiloxane dendrimer-functional vinyl-type polymer. The carbosiloxane dendrimer structure in this pendant carbosiloxane dendrimer-functional vinyl-type polymer denotes a high-molecular-weight group with a predictable and highly branched structure that elaborates radially from a single core. An example of a carbosiloxane dendrimer having such a structure is the highly branched siloxane-silalkylene copolymer taught in the specification of Japanese Patent Application Number Hei 9-171154 (171,154/1997).

The carbosiloxane dendrimer structure in the vinyl-type polymer in the water repellent preferably is a group with the following general formula.

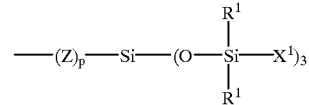

Z is a divalent organic group, for example, an alkylene group, arylene group, aralkylene group, ester-containing divalent organic group, ether-containing divalent organic group, ketone-containing divalent organic group, or amide-containing divalent organic group, among which organic groups with the following structures are preferred.

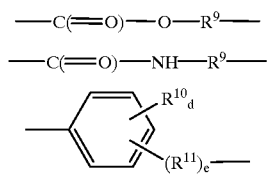

$R^9$ represents $C_1$ to $C_{10}$ alkylene, for example, methylene, ethylene, propylene, and butylene with methylene and propylene being preferred. $R^{10}$ represents $C_1$ to $C_{10}$ alkyl, for example, methyl, ethyl, propyl, and butyl with methyl being preferred. $R^{11}$ represents $C_1$ to $C_{10}$ alkylene, for example, methylene, ethylene, propylene, and butylene with ethylene being preferred. The subscript d is an integer from 0 to 4, and e is 0 or 1.

$R^1$ is $C_1$ to $C_{10}$ alkyl or aryl. The alkyl encompassed by $R^1$ is exemplified by methyl, ethyl, propyl, butyl, pentyl, isopropyl, isobutyl, cyclopentyl, and cyclohexyl. The aryl encompassed by $R^1$ is exemplified by phenyl and naphthyl. Methyl and phenyl are preferred for $R^1$, and methyl is particularly preferred. $X^1$ is the silylalkyl group with the following formula at i=1.

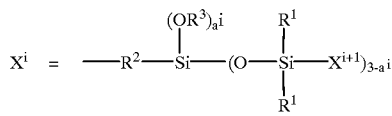

$R^1$ is defined as above. $R^2$ represents $C_2$ to $C_{10}$ alkylene and is exemplified by straight-chain alkylene such as ethylene, propylene, butylene, and hexylene, and by branched alkylene such as methylmethylene, methylethylene, 1-methylpentylene, and 1,4-dimethylbutylene. Ethylene, methylethylene, hexylene, 1-methylpentylene, and 1,4-dimethylbutylene are preferred for $R^2$. $R^3$ in the preceding formula is $C_1$ to $C_{10}$ alkyl and is exemplified by methyl, ethyl, propyl, butyl, and isopropyl. The superscript i is an integer with a value from 1 to 10 that specifies the generation of said silylalkyl group, and $a^i$ is an integer from 0 to 3.

Preferred for use in the water repellent is a carbosiloxane dendrimer-functional vinyl-type polymer as afforded by the polymerization of (A) 0 to 99.9 weight parts vinyl monomer
and
(B) 100 to 0.1 weight parts carbosiloxane dendrimer that contains a radically polymerizable organic group and has the following general formula.

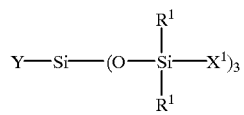

Y is a radically polymerizable organic group. $R^1$ is $C_1$ to $C_{10}$ alkyl or aryl. The alkyl encompassed by $R^1$ is exemplified by methyl, ethyl, propyl, butyl, pentyl, isopropyl, isobutyl, cyclopentyl, and cyclohexyl. The aryl encompassed by $R^1$ is exemplified by phenyl and naphthyl. Methyl and phenyl are preferred for $R^1$, and methyl is particularly preferred. $X^1$ is the silylalkyl group with the following formula at i=1.

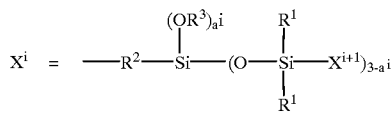

($R^1$ is defined as above; $R^2$ is $C_2$ to $C_{10}$ alkylene; $R^3$ is $C_1$ to $C_{10}$ alkyl, for example, methyl, ethyl, propyl, and butyl; $X^{i+1}$ is selected from the set consisting of the hydrogen atom, $C_1$ to $C_{10}$ alkyl, aryl, and the above-defined silylalkyl group; i is an integer with a value from 1 to 10 that specifies the generation of said silylalkyl group; and $a^i$ is an integer from 0 to 3).

Considering this vinyl-type polymer in greater detail, the vinyl monomer (A) should contain a radically polymerizable vinyl group, but the type and other properties of this monomer are not otherwise critical. This vinyl monomer (A) is exemplified by lower alkyl (meth)acrylates such as methyl (meth)acrylate, ethyl (meth)acrylate, n-propyl (meth)acrylate, and isopropyl (meth)acrylate; higher alkyl (meth)acrylates such as n-butyl (meth)acrylate, isobutyl (meth)acrylate, tert-butyl (meth)acrylate, n-hexyl (meth)acrylate, cyclohexyl (meth)acrylate, 2-ethylhexyl (meth)acrylate, octyl (meth)acrylate, lauryl (meth)acrylate, and stearyl (meth)acrylate; the vinyl esters of lower aliphatic acids, such as vinyl acetate and vinyl propionate; the vinyl esters of higher aliphatic acids, such as vinyl butyrate, vinyl caproate, vinyl 2-ethylhexanoate, vinyl laurate, and vinyl stearate; aromatic vinyl monomers such as styrene, vinyltoluene, benzyl (meth)acrylate, phenoxyethyl (meth)acrylate, and vinylpyrrolidone; amide-functional vinyl monomers such as (meth)acrylamide, N-methylol(meth)acrylamide, N-methoxymethyl(meth)acrylamide, isobutoxymethoxy (meth)acrylamide, and N,N-dimethyl(meth)acrylamide; hydroxyl-functional vinyl monomers such as 2-hydroxyethyl (meth)acrylate, 2-hydroxybutyl (meth)acrylate, and 2-hydroxypropyl (meth)acrylate; fluorinated vinyl monomers such as trifluoropropyl (meth)acrylate, perfluorobutylethyl (meth)acrylate, and perfluorooctylethyl (meth)acrylate; epoxy-functional vinyl monomers such as glycidyl (meth)acrylate and 3,4-epoxycyclohexylmethyl (meth)acrylate; carboxyl-functional vinyl monomers such as (meth)acrylic acid, itaconic acid, crotonic acid, fumaric acid, and maleic acid; ether linkage-containing vinyl monomers such as tetrahydrofurfuryl (meth)acrylate, butoxyethyl (meth)acrylate, ethoxydiethylene glycol (meth)acrylate, polyethylene glycol (meth)acrylate, polypropylene glycol mono(meth)acrylate, hydroxybutyl vinyl ether, cetyl vinyl ether, and 2-ethylhexyl vinyl ether; unsaturated group-functionalized silicone compounds such as (meth)acryloxypropyltrimethoxysilane, polydimethylsiloxane (branched or straight-chain) bearing a (meth)acryl group at a single terminal, and polydimethylsiloxane bearing a styryl group at a single terminal; butadiene; vinyl chloride; vinylidene chloride; (meth)acrylonitrile; dibutyl fumarate; maleic anhydride; dodecylsuccinic anhydride; (meth)acryl glycidyl ether; the alkali metal salts, ammonium salts, and organic amine salts of radically polymerizable unsaturated carboxylic acids such as (meth)acrylic acid, itaconic acid, crotonic acid, fumaric acid, and maleic acid; radically polymerizable unsaturated monomers that contain a sulfonic acid residue, e.g., styrenesulfonic acid, as well as their alkali metal salts, ammonium salts, and organic amine salts; quaternary ammonium salts that are derived from (meth)acrylic acid, such as 2-hydroxy-3-methacryloxypropyltrimethylammonium chloride; and the methacrylate esters of alcohols that contain a tertiary amine group, such as the diethylamine ester of methacrylic acid, as well as the quaternary ammonium salts thereof. Component (A) is preferably a (meth)acrylate, for which specific examples are alkyl (meth)acrylates such as methyl (meth)acrylate, ethyl (meth)acrylate, n-butyl (meth)acrylate, and 2-ethylhexyl (meth)acrylate; hydroxyalkyl (meth)acrylates such as 2-hydroxyethyl (meth)acrylate, 2-hydroxypropyl (meth)acrylate, and 2-hydroxybutyl (meth)acrylate; fluoroalkyl (meth)acrylates such as trifluoropropyl (meth)acrylate, perfluorobutylethyl (meth)acrylate, and perfluorooctylethyl (meth)acrylate; and epoxy-functional (meth)acrylates such as glycidyl (meth)acrylate and 3,4-epoxycyclohexylmethyl (meth)acrylate.

Also usable are multifunctional vinyl monomers, as exemplified by (meth)acryloyl-functional monomers such as trimethylolpropane tri(meth)acrylate, pentaerythritol tri(meth)acrylate, ethylene glycol di(meth)acrylate, tetraethylene glycol di(meth)acrylate, polyethylene glycol di(meth)acrylate, 1,4-butanediol di(meth)acrylate, 1,6-hexanediol di(meth)acrylate, neopentyl glycol di(meth)acrylate, trimethylolpropane trioxyethyl(meth)acrylate, tris(2-hydroxyethyl)isocyanurate di(meth)acrylate, tris(2-hydroxyethyl)isocyanurate tri(meth)acrylate, the di(meth)acrylates of diols that are the adducts of ethylene oxide or propylene oxide on bisphenol A, the di(meth)acrylates of diols that are the adducts of ethylene oxide or propylene oxide on hydrogenated bisphenol A, and triethylene glycol divinyl ether; and also by unsaturated group-functional silicone compounds such as polydimethylsiloxane endblocked at both terminals by the styryl group and polydimethylsiloxane endblocked at both terminals by methacryloxypropyl.

The use of a silicone compound containing both a radically polymerizable unsaturated group and a silicon-bonded hydrolyzable group is preferred because this improves the durability of the water repellency of the resulting polymer. The radically polymerizable unsaturated group can be exemplified by (meth)acryloxy-functional organic groups, (meth) acrylamide-functional organic groups, styryl-functional organic groups, $C_2$ to $C_{10}$ alkenyl, vinyloxy, and allyloxy. The silicon-bonded hydrolyzable group can be exemplified by halogen, alkoxy, and acetoxy. This type of component (A) can be specifically exemplified by organosilanes such as methacryloxypropyltrimethoxysilane, methacryloxypropylmethyldimethoxysilane, methacryloxypropyldimethylmethoxysilane, acryloxypropyltrimethoxysilane, acryloxypropylmethyldimethoxysilane, acryloxypropyldimethylmethoxysilane, vinyltrimethoxysilane, vinyltriethoxysilane, and vinylbutyldibutoxysilane.

The carbosiloxane dendrimer (B) has the following general formula.

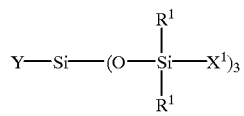

Y in this general formula is a radically polymerizable organic group. Generally Y will be a group capable of undergoing radical-mediated addition, while at a more specific level Y is exemplified by $C_2$ to $C_{10}$ alkenyl and by the (meth)acryloxy-functional organic groups, (meth)acrylamide-functional organic groups, and styryl-functional organic groups with the following general formulas.

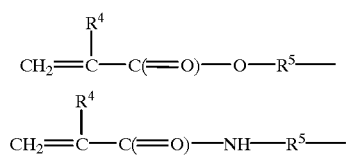

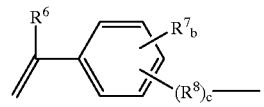

$R^4$ and $R^6$ are hydrogen or methyl; $R^5$ and $R^8$ are $C_1$ to $C_{10}$ alkylene; $R^7$ is $C_1$ to $C_{10}$ alkyl; b is an integer from 0 to 4; and c is 0 or 1. These radically polymerizable organic groups are exemplified by acryloxymethyl, 3-acryloxypropyl, methacryloxymethyl, 3-methacryloxypropyl, 4-vinylphenyl, 3-vinylphenyl, 4-(2-propenyl)phenyl, 3-(2-propenyl)phenyl, 2-(4-vinylphenyl)ethyl, 2-(3-vinylphenyl)ethyl, vinyl, allyl, methallyl, and 5-hexenyl. $R^1$ in the general formula for the carbosiloxane dendrimer (B) is $C_1$ to $C_{10}$ alkyl or aryl. The alkyl encompassed by $R^1$ is exemplified by methyl, ethyl, propyl, butyl, pentyl, isopropyl, isobutyl, cyclopentyl, and cyclohexyl. The aryl encompassed by $R^1$ is exemplified by phenyl and naphthyl. Methyl and phenyl are preferred for $R^1$, and methyl is particularly preferred. $X^1$ is the silylalkyl group with the following formula at i=1.

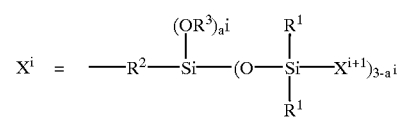

$R^1$ is defined as above. $R^2$ represents $C_2$ to $C_{10}$ alkylene and is exemplified by straight-chain alkylene such as ethylene, propylene, butylene, and hexylene, and by branched alkylene such as methylmethylene, methylethylene, 1-methylpentylene, and 1,4-dimethylbutylene. Ethylene, methylethylene, hexylene, 1-methylpentylene, and 1,4-dimethylbutylene are preferred for $R^2$. $R^3$ is $C_1$ to $C_{10}$ alkyl, for example, methyl, ethyl, propyl, butyl, or isopropyl. $X^{i+1}$ is selected from the set consisting of the hydrogen atom, $C_1$ to $C_{10}$ alkyl, aryl, and the above-defined silylalkyl group; $a^i$ is an integer from 0 to 3, and i is an integer with a value from 1 to 10 that specifies the generation of said silylalkyl group, i.e., that indicates the number of repetitions of this silylalkyl group.

Thus, the carbosiloxane dendrimer (B) has the following general formula when the number of generations is 1:

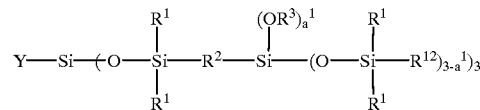

wherein Y, $R^1$, $R^2$, and $R^3$ are defined as above; $R^{12}$ is the hydrogen atom or is defined as for $R^1$; $a^1$ is defined as for $a^i$; and the average of the sum of the $a^1$ values in each molecule is from 0 to 7.

The carbosiloxane dendrimer (B) has the following general formula when the number of generations is 2:

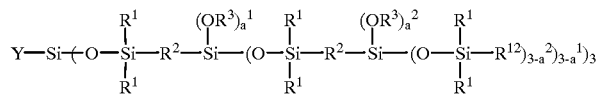

wherein Y, $R^1$, $R^2$, $R^3$, and $R^{12}$ are defined as above; $a^1$ and $a^2$ are defined as for $a^i$; and the average of the sum of the $a^1$ and $a^2$ values in each molecule is from 0 to 25.

The carbosiloxane dendrimer (B) has the following general formula when the number of generations is 3:

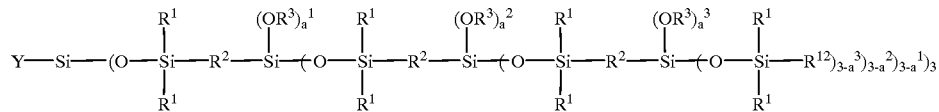

wherein Y, $R^1$, $R^2$, $R^3$, and $R^{12}$ are defined as above; $a^1$, $a^2$ and $a^3$ are defined as for $a^i$; and the average of the sum of the $a^1$, $a^2$, and $a^3$ values in each molecule is from 0 to 79.

Carbosiloxane dendrimers with the following average compositional formulas are examples of component (B), i.e., carbosiloxane dendrimer functionalized with a radically polymerizable organic group.

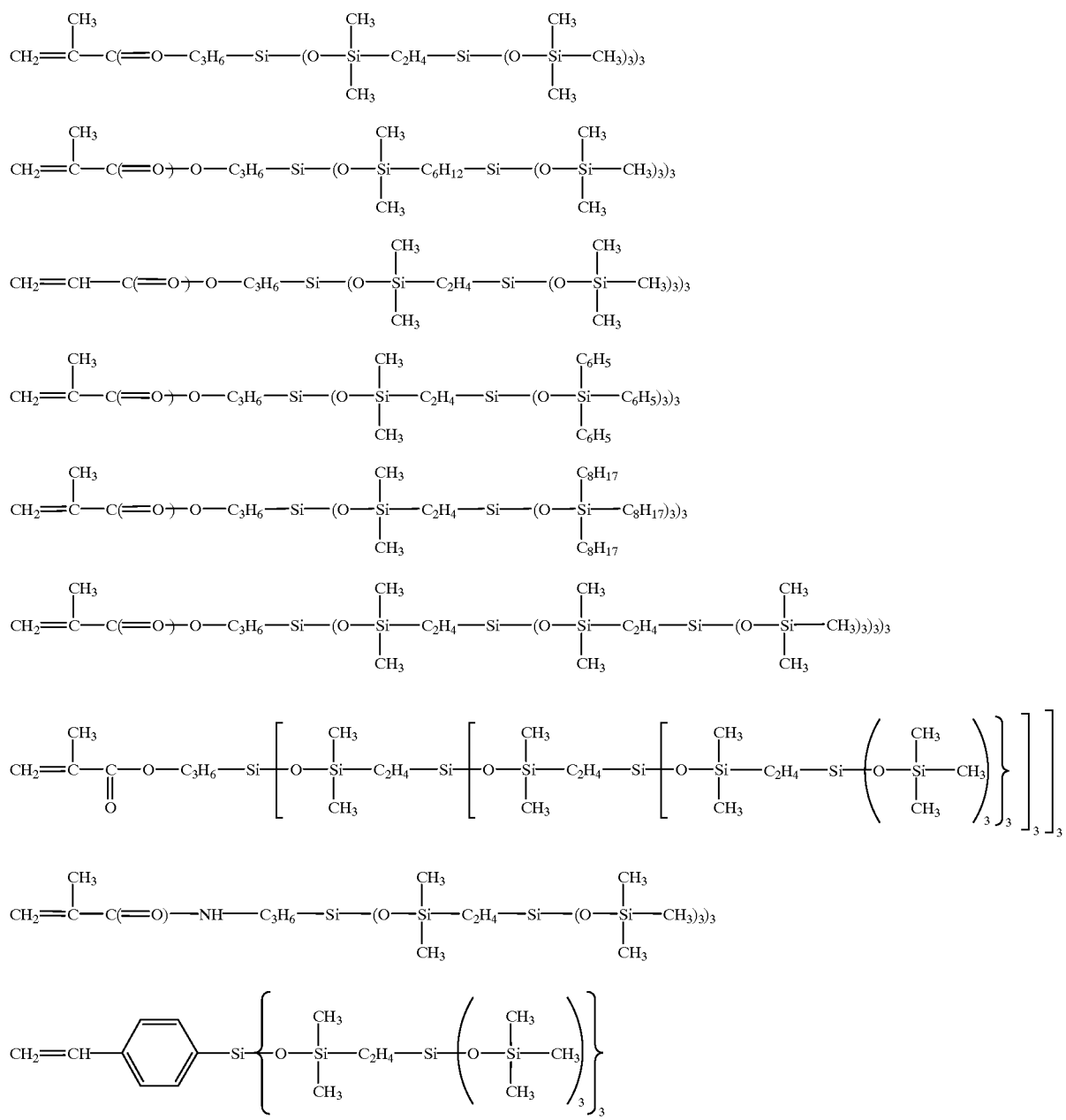

-continued

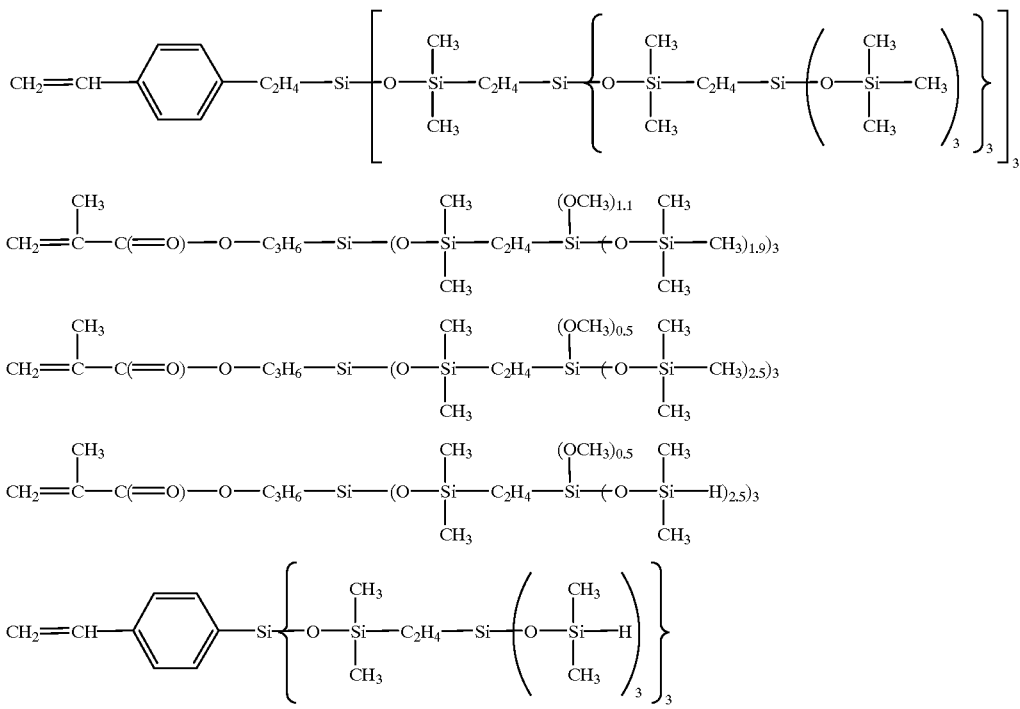

The carbosiloxane dendrimer described above can be synthesized by the method for synthesizing branched siloxane-silalkylene copolymer that is described in the specification of Japanese Patent Application Number Hei 9-171154 (171,154/1997). This synthesis can be carried out, for example, by running a hydrosilylation reaction between an alkenyl-functional organosilicon compound and an SiH-functional silicon compound with the following general formula

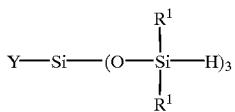

in which $R^1$ and Y are defined as above. The silicon compound with this formula can be exemplified by 3-methacryloxypropyltris(dimethylsiloxy)silane, 3-acryloxypropyltris(dimethylsiloxy)silane, and 4-vinylphenyltris(dimethylsiloxy)silane. The alkenyl-functional organosilicon compound referenced above can be exemplified by vinyltris(trimethylsiloxy)silane, vinyltris (dimethylphenylsiloxy)silane, and 5-hexenyltris (trimethylsiloxy)silane. This hydrosilylation reaction is preferably run in the presence of a transition metal catalyst, e.g., chloroplatinic acid or a platinum-vinylsiloxane complex.

The component (A): component (B) polymerization ratio in the dendrimer-functional vinyl-type polymer used in the present invention should be in the range from 0:100 to 99.9:0.1 as the component (A) : component (B) weight ratio and is preferably from 1:99 to 99:1 and is more preferably from 10:90 to 80:20. A component (A):component (B) ratio of 0:100 indicates that the subject polymer may be a homopolymer of component (B).

The carbosiloxane dendrimer-functional vinyl-type polymer used in this invention is afforded by the copolymerization of components (A) and (B) or by the polymerization of component (B) alone. This polymerization can be effected by a radical polymerization mechanism or ionic polymerization mechanism using a solution polymerization method, emulsion polymerization method, suspension polymerization method, or bulk polymerization method, among which solution polymerization by a radical polymerization mechanism is highly suitable. This solution polymerization can be run by reacting components (A) and (B) in solvent in the presence of a radical initiator for 3 to 20 hours at a temperature of 50 to 180° C. The solvent used for this solution polymerization can be exemplified by aliphatic hydrocarbons such as hexane, octane, decane, and cyclohexane; aromatic hydrocarbons such as benzene, toluene, and xylene; ethers such as diethyl ether, dibutyl ether, tetrahydrofuran, and dioxane; ketones such as acetone, methyl ethyl ketone, methyl isobutyl ketone, and diisobutyl ketone; esters such as methyl acetate, ethyl acetate, butyl acetate, and isobutyl acetate; alcohols such as methanol, ethanol, isopropyl alcohol, and butanol; and organosiloxane oligomers such as octamethylcyclotetrasiloxane, decamethylcyclopentasiloxane, hexamethyldisiloxane, and octamethyltrisiloxane.

Those compounds generally known in the art for use in radical polymerization can be used as the radical initiator. These are specifically exemplified by azobis compounds such as 2,2'-azobis(isobutyronitrile), 2,2'-azobis(2-methylbutyronitrile), and 2,2'-azobis(2,4-dimethylvaleronitrile), and by organoperoxides such as benzoyl peroxide, lauroyl peroxide, tert-butyl peroxybenzoate, and tert-butyl peroxy-2-ethylhexanoate. This radical initiator can be a single compound or a combination of two or more compounds. The radical initiator is preferably used at from 0.1 to 5 weight parts for each 100 weight parts of the sum of components (A) and (B).

A chain transfer agent may also be added to the polymerization. This chain transfer agent is exemplified by mercapto compounds such as 2-mercaptoethanol, butyl mercaptan, n-dodecyl mercaptan, 3-mercaptopropyltrimethoxysilane, and mercaptopropyl-functional polydimethylsiloxane, and by halogenated compounds such as methylene chloride, chloroform, carbon tetrachloride, butyl bromide, and 3-chloropropyltrimethoxysilane.

Production of the vinyl-type polymer of the invention preferably includes a post-polymerization removal of the residual unreacted vinyl monomer by heating under reduced pressure.

The number-average molecular weight of the pendant carbosiloxane dendrimer-functional vinyl-type polymer used in the present invention will generally be from 3,000 to 2,000,000, preferably is from 5,000 to 1,000,000, and particularly preferably is from 10,000 to 100,000.

The water repellent of the invention can be prepared simply by dissolving the pendant carbosiloxane dendrimer-functional vinyl-type polymer as described above in solvent comprising 1 or more selections from the group consisting of the solvents described above; halogenated hydrocarbons such as trichloroethane, trichloroethylene, and perchloroethylene; and aliphatic hydrocarbons such as n-hexane, n-heptane, cyclohexane, and isooctane.

The water-based dispersion or emulsion afforded by emulsion or suspension polymerization can be used—either directly or after dilution in water—as a water-based water repellent. The content of the pendant carbosiloxane dendrimer-functional vinyl-type polymer active ingredient in this instance is preferably from 0.5 to 20 weight % and particularly preferably is from 2 to 15 weight %. At a content below 0.5 weight % the add-on to the solid will be too low and the water repellency will be inadequate as a consequence. At a content in excess of 20 weight %, the add-on to the solid will be too high, resulting in a poor handle, and there is a pronounced tendency for whitening and powder ejection to occur.

This invention further relates to a spray-formulated water repellent for the treatment of solids that comprises from 1 to 50 weight % propellant gas, from 30 to 98.5 weight % organic solvent, and from 0.5 to 20 weight % of the hereinabove described pendant carbosiloxane dendrimer-functional vinyl-type polymer. The pendant carbosiloxane dendrimer-functional vinyl-type polymer used in this invention is the same as the pendant carbosiloxane dendrimer-functional vinyl-type polymer already described above. Its content in this instance will generally be from 0.5 to 20 weight % and is preferably from 2 to 15 weight %.

The solvent used in this spray-formulated water repellent should be capable of dissolving the pendant carbosiloxane dendrimer-functional vinyl-type polymer, but its type and other properties are not critical. However, in a preferred embodiment alcohol will constitute at least 80 weight % of this organic solvent. The use of less than 30 weight % of such an alcohol-rich organic solvent will in some cases result in powder ejection and whitening phenomena. The use of more than 98.5 weight % causes a number of problems: spray formation becomes difficult and use as a spray-formulated water repellent is hindered; also, the water repellency performance can be poor. The alcohol used here is exemplified by monohydric alcohols such as ethanol and isopropyl alcohol and by dihydric alcohols such as ethylene glycol and propylene glycol, among which ethanol and isopropyl alcohol are preferred.

The propellant gas enables the water repellent composition to be sprayed in a mist or spray form. The propellant gas is selected from the propellant gases known in the art. For example, based on such factors as the state and behavior of the spray and the gas pressure employed, a suitable single selection or a mixture of two or more selections can be made from propane, butane, dimethyl ether gas, carbon dioxide, and nitrogen. The amount of propellant gas used cannot be rigorously specified because it will vary substantially as a function of the type of propellant gas. However, it is difficult to make the spray-formulated water repellent at less than 1 weight % propellant gas, while the use of more than 50 weight % can result in powder ejection and whitening phenomena.

The water repellent can be used on solids such as, for example, various fibers; sheet-form solids such as the knits and weaves of said various fibers, nonwoven fabrics, paper, natural and synthetic leathers, cellophane, and plastic films; foams such as the foams of synthetic resins; moldings such as the moldings of synthetic resins, natural rubber, synthetic rubber, metal, and glass; and particulates such as wood powder, inorganic powders, synthetic resin powders, and rubber powders. Considered from the perspective of constituent material, the fibers can be exemplified by natural fibers such as hair, wool, silk, flax, hemp, cotton, and asbestos; regenerated fibers such as rayon and acetate; synthetic fibers such as the fibers of polyester, polyamide, vinylon, polyacrylonitrile, polyethylene, polypropylene, and spandex; and also by glass fiber, carbon fiber, and silicon carbide fiber. These fibers can take the form of the staple, filament, tow, or yarn. Their fabrics or textiles can take the form of knits, weaves, nonwoven fabrics, resin-treated cloth and fabric, and the sewn products of the preceding.

The water repellent can impart an excellent water repellency to solids simply by application to the surface of a solid as described above by, for example, dipping or spraying, followed by drying at ambient temperature or with heating.

The water repellent for treating solids is characteristically able to impart an excellent water repellency to the treated solid and in particular is able to impart a highly durable or robust water repellency because it contains a pendant carbosiloxane dendrimer-functional vinyl-type polymer as its base or active ingredient. Moreover, since the spray-formulated water repellent of the present invention can use an alcohol as its solvent, the spray formulation is characterized by an excellent durability for the imparted water repellency as well as by the absence of negative environmental effects.

EXAMPLES

These examples are intended to illustrate the invention to those skilled in the art and should not be interpreted as limiting the scope of the invention set forth in the claims.

Reference Example 1

300 g isopropyl alcohol was placed in a one-liter four-neck glass flask equipped with a stirrer, condenser, and thermometer. While stirring under a nitrogen current, a liquid mixture of 90 g of the radically polymerizable carbosiloxane dendrimer with the following formula

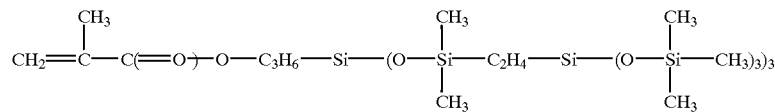

132 g methyl methacrylate, 78 g butyl acrylate, and 0.3 g radical polymerization initiator (α,α'-azobisisobutyronitrile) was added dropwise over 1 hour at 80° C. A polymerization reaction was run for 6 hours at 80° C. to yield an isopropyl alcohol solution of pendant carbosiloxane dendrimer-functional vinyl-type polymer. Part of this isopropyl alcohol solution was introduced into a large amount of methanol. After stirring, the solution was brought to quiescence and the precipitate was separated off to yield a transparent, colorless solid consisting of the pendant carbosiloxane dendrimer-functional vinyl-type polymer. Analysis of this solid by gel permeation chromatography (GPC) gave a weight-average molecular weight of approximately 30,000 (as polystyrene).

Reference Example 2

300 g isopropyl alcohol was placed in a one-liter flask four-neck glass flask equipped with a stirrer, condenser, and thermometer. While stirring under a nitrogen current, a liquid mixture of 120 g of the radically polymerizable carbosiloxane dendrimer as used in Reference Example 1, 90 g methyl methacrylate, 90 g ethyl acrylate, and 0.3 g radical polymerization initiator (α,α'-azobisisobutyronitrile) was added dropwise over 1 hour at 80° C. A polymerization reaction was run for 6 hours at 80° C. to yield an isopropyl alcohol solution of pendant carbosiloxane dendrimer-functional vinyl-type polymer. Part of this solution was air-dried to afford a transparent, colorless solid consisting of the pendant carbosiloxane dendrimer-functional vinyl-type polymer. Analysis of this solid by gel permeation chromatography (GPC) gave a weight-average molecular weight of approximately 20,000 (as polystyrene).

Reference Example 3

The isopropyl alcohol solution of a dimethylpolysiloxane-containing vinyl-type polymer was obtained by operating as in Reference Example 1, but in this case using the methacryloxypropyl-functional dimethylpolysiloxane with the following formula in place of the methacryloxy-functional carbosiloxane dendrimer used in Reference Example 1.

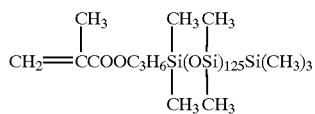

A part of the solution was air-dried to give a somewhat milky white solid. Bleed out by the starting methacryloxypropyl-functional dimethylpolysiloxane was observed. This solid had a weight-average molecular weight (as polystyrene) by GPC of approximately 26,000.

Reference Example 4

The water repellency and its durability were evaluated in the examples using the following methods.

Water Repellency Testing by the Spray Method

This measurement was carried out based on Japanese Industrial Standard (JIS) L-1092–1986. Using the spray test method, water was sprayed on the top surface of the test sample. The water repellency was scored as 0 when the surface and underside of the sample were wetted in their entirety; as 50 when only the surface was wetted in its entirety; as 70 when half of the surface was wetted and small individual water drops permeated into the fabric; as 80 when the surface was wetted by small individual water drops; as 90 when no wetting of the top surface was observed although small water drops were attached; and as 100 when there was no wetting of the surface or attachment of water drops.

Durability of the Water Repellency

A. Durability to laundering

A wash bath was prepared by the addition of 5 g sodium alkylbenzenesulfonate and 2 g sodium carbonate per 1 liter water. After having completed the water repellency treatment, the fabric was introduced into this bath and was washed for 15 minutes at a water temperature of 50° C. and a bath ratio of 1:100 using a household electric washing machine. The fabric was then dried after 2 rinses in only water. After laundering 5 times by this procedure, the fabric was submitted to water repellency testing by the spray method as described above.

B. Durability to manual rubbing

After completion of the water repellency treatment, the fabric (25 cm×15 cm) was folded in sixths; the two edges of the fabric were lightly grasped with the hands as in hand washing; and the fabric was manually rubbed 20 to 30 times with the palms of the hands. The fabric was then submitted to water repellency testing by the spray method as described above.

Example 1

The isopropyl alcohol solution of the pendant carbosiloxane dendrimer-functional vinyl-type polymer synthesized in Reference Example 1 was diluted to give a water repellent consisting of the 1 weight % isopropyl alcohol solution of the pendant carbosiloxane dendrimer-functional vinyl-type polymer. Polyester taffeta intended as the outer layer in winterproof clothing, nylon taffeta, and cotton twill were dipped in this water repellent, removed, and the excess water repellent was eliminated by wringing out at an expression ratio of 100% using a mangle roll. This was followed by drying for 2 minutes at 80° C. to give the water repellent-treated polyester taffeta, nylon taffeta, and cotton twill. These water repellent-treated fabrics were then submitted to the spray-method water repellency testing. The handle was also evaluated. The results are in Table 1.

Example 2

The isopropyl alcohol solution of the pendant carbosiloxane dendrimer-functional vinyl-type polymer synthesized in Reference Example 2 was diluted to give a water repellent consisting of the 1 weight % isopropyl alcohol solution of the pendant carbosiloxane dendrimer-functional vinyl-type polymer. Polyester taffeta intended as the outer layer in winterproof clothing, nylon taffeta, and cotton twill were dipped in this water repellent, removed, and the water repellent was eliminated by wringing out at an expression ratio of 100% using a mangle roll. This was followed by drying for 2 minutes at 80° C. to give the water repellent-treated polyester taffeta, nylon taffeta, and cotton twill. These water repellent-treated fabrics were then submitted to the spray-method water repellency testing. The handle was also evaluated. The results are in Table 1.

Comparative Example 1

A water repellent was prepared by mixing 1 weight part trimethylsiloxy-endblocked methylhydrogenpolysiloxane (viscosity at 25° C.=20 mPa·s, silicon-bonded hydrogen content=1.6 weight %), 0.05 weight part dibutyltin dioctoate, and 98.95 weight parts n-heptane. The properties of this water repellent were evaluated as in Example 1, and the results are in Table 1.

TABLE 1

|  | Example 1 | Example 2 | Comp. Ex. 1 |
|---|---|---|---|
| water repellency |  |  |  |
| polyester taffeta | 90 | 90 | 70 |
| nylon taffeta | 90 | 90 | 70 |
| cotton twill | 90–100 | 90–100 | 80 |
| handle |  |  |  |
| polyester taffeta | excellent (suitable stretch) | excellent (suitable stretch) | slick feel |
| nylon taffeta | excellent (suitable stretch) | excellent (suitable stretch) | slick feel |
| cotton twill | excellent (suitable stretch) | excellent (suitable stretch) | slick feel |
| overall evaluation | excellent | excellent | poor (inadequate water repellency, unsuitably slick feel) |

Example 3

Water repellent-treated cotton twill was prepared as in Example 1 and submitted to testing of the durability of the water repellency. The obtained results are reported in Table 2.

Example 4

After cotton twill had been dipped in water repellent prepared as described in Example 1, the water repellent was removed using a mangle roll at a 100% expression ratio. This was followed by drying for 5 hours at room temperature. The resulting sample was submitted to repetitive laundering as in Example 3 to investigate the durability of the water repellency. The results are in Table 2.

Example 5

Water repellent-treated polyester taffeta was prepared as described in Example 2 and submitted to testing of the durability of the water repellency. The results are in Table 2.

Example 6

The durability of the water repellency was investigated as in Example 4, but in this case using the water repellent prepared in Example 2 in place of the water repellent prepared in Example 1. The results are in Table 2.

Comparative Example 2

A sample was prepared by dipping the polyester taffeta in water repellent prepared as described in Comparative Example 1, removal from the bath, elimination of the excess water repellent, and heating for 2 minutes at 150° C. The durability of the water repellency was investigated as in Example 3, and the results are in Table 2.

TABLE 2

|  | Example 3 | Example 4 | Example 5 | Example 6 | Comp. Example 2 |
|---|---|---|---|---|---|
| durability to laundering |  |  |  |  |  |
| 0 launderings | 90–100 | 90–100 | 90–100 | 90–100 | 80 |
| 5 launderings | 90 | 90 | 90–100 | 90–100 | 0–50 |
| durability to manual rubbing |  |  |  |  |  |
| 0 cycles | 90–100 | 90–100 | 90–100 | 90–100 | 50 |
| 5 cycles | 90 | 90 | 90–100 | 90–100 | 50 |

|  | durability to laundering | | durability to manual rubbing | |
|---|---|---|---|---|
|  | 0 launderings | 5 launderings | 0 cycles | 5 cycles |
| Example 3 | 90–100 | 90 | 90–100 | 90 |
| Example 4 | 90–100 | 90 | 90–100 | 90 |
| Example 5 | 90–100 | 90–100 | 90–100 | 90–100 |
| Example 6 | 90–100 | 90–100 | 90–100 | 90–100 |
| Comp. Ex. 2 | 80 | 0–50 | 50 | 50 |

Example 7

A child's winter jumper (dry cleaned 3 times) was hung on a hanger and its surface was sprayed using an air gun with water repellent prepared as described in Example 1. The spray-treated jumper was then hung overnight to dry. The water repellent-treated jumper was subsequently spread out on a desk and 10 drops of water were dripped from a syringe onto separate locations on the spray-treated side, and the extent of drop preservation or retention was monitored. All 10 of the water drops retained their shape even at 30 minutes after their application.

Comparative Example 3

The extent of water drop retention on a child's winter jumper was evaluated as in Example 7, but using the water

We claim:

1. A spray-formulated water repellent comprising:
   (i) a propellant gas,
   (ii) an organic solvent, and
   (iii) a pendant carbosiloxane dendrimer-functional vinyl-type polymer having a carbosiloxane dendrimer group with the formula $$-(Z)_p-Si-(O-\underset{R^1}{\overset{R^1}{Si}}-X^1)_3$$

wherein Z is a divalent organic group, p is 0 or 1, $R^1$ is $C_1$ to $C_{10}$ alkyl or aryl, and $X^1$ is a silylalkyl group having the formula at i=1

$$X^i = -R^2-\underset{R^1}{\overset{(OR^3)_{a^i}}{Si}}-(O-\underset{R^1}{\overset{R^1}{Si}}-X^{i+1})_{3-a^i}$$

wherein $R^1$ is defined as above; $R^2$ is $C_2$ to $C_{10}$ alkylene; $R^3$ is $C_1$ to $C_{10}$ alkyl; $X^{i+1}$ is selected from the group consisting of a hydrogen atom, $C_1$ to $C_{10}$ alkyl, aryl, and the silylalkyl group; i is an integer with a value from 1 to 10; and $a^i$ is an integer from 0 to 3.

2. The water repellent of claim 1, wherein the pendant carbosiloxane dendrimer-functional vinyl-type polymer has been prepared by the polymerization of a composition comprising component (B), a carbosiloxane dendrimer that comprises a radically polymerizable organic group, wherein said carbosiloxane dendrimer has the formula $$Y-Si-(O-\underset{R^1}{\overset{R^1}{Si}}-X^1)_3$$

wherein Y is a radically polymerizable organic group, $R^1$ is as defined above, and $X^1$ is the silylalkyl group having the formula at i=1

$$X^i = -R^2-\underset{R^1}{\overset{(OR^3)_{a^i}}{Si}}-(O-\underset{R^1}{\overset{R^1}{Si}}-X^{i+1})_{3-a^i}$$

wherein $R^1$, $R^2$, $R^3$, $X^{i+1}$, i, and $a^i$ are as defined above.

3. The water repellent of claim 2, wherein Y is selected from the group consisting of:
   (a) acryl- and methacryl-functional organic groups with the general formulas $$CH_2=\underset{R^4}{\overset{}{C}}-C(=O)-O-R^5-,\text{ and}$$

$$CH_2=\underset{R^4}{\overset{}{C}}-C(=O)-NH-R^5-$$

wherein $R^4$ is selected from the group consisting of a hydrogen atom and a methyl group, and $R^5$ is $C_1$ to $C_{10}$ alkylene;
   (b) styryl-functional organic groups with the general formula

[styryl structure with $R^6$, $R^7_b$, $(R^8)_c$]

wherein $R^6$ is selected from the group consisting of a hydrogen atom and a methyl group, $R^7$ is $C_1$ to $C_{10}$ alkyl, $R^8$ is $C_1$ to $C_{10}$ alkylene, b is an integer from 0 to 4, and c is 0 or 1; and
   (c) $C_2$ to $C_{10}$ alkenyl.

4. The water repellent of claim 1, wherein the water repellent comprises: (i) 1 to 50 weight % of the propellant gas, (ii) 30 to 98.5 weight % of the organic solvent, and (iii) 0.5 to 20 weight % of the pendant carbosiloxane dendrimer-functional vinyl-type polymer.

5. The water repellent of claim 1, wherein (ii) the organic solvent is an alcohol.

6. The water repellent of claim 1, wherein (i) the propellant gas is selected from the group consisting of propane, butane, dimethyl ether gas, carbon dioxide, nitrogen, and a mixture of two or more of said gases.

7. A method of preparing a water repellent, wherein the method comprises:
   dissolving a pendant carbosiloxane dendrimer-functional vinyl-type polymer in an organic solvent,
      wherein the pendant carbosiloxane dendrimer-functional vinyl-type polymer comprises a carbosiloxane dendrimer group with the formula $$-(Z)_p-Si-(O-\underset{R^1}{\overset{R^1}{Si}}-X^1)_3$$

wherein Z is a divalent organic group, p is 0 or 1, $R^1$ is $C_1$ to $C_{10}$ alkyl or aryl, and $X^1$ is a silylalkyl group having the formula at i=1

$$X^i = -R^2-\underset{R^1}{\overset{(OR^3)_{a^i}}{Si}}-(O-\underset{R^1}{\overset{R^1}{Si}}-X^{i+1})_{3-a^i}$$

wherein $R^1$ is defined as above; $R^2$ is $C_2$ to $C_{10}$ alkylene; $R^3$ is $C_1$ to $C_{10}$ alkyl; $X^{i+1}$ is selected from the group consisting of a hydrogen atom, $C_1$ to $C_{10}$ alkyl, aryl, and the silylalkyl group; i is an integer with a value from 1 to 10; and $a^i$ is an integer from 0 to 3; and
   wherein the organic solvent is selected from the group consisting of aliphatic hydrocarbons, aromatic hydrocarbons, ethers, ketones, esters, organosiloxane oligomers, and alcohols.

8. A method for preparing a water-based water repellent, wherein the method comprises:

1) preparing a composition selected from the group consisting of an emulsion and a suspension, wherein preparing the composition is carried out by heating to a temperature of 50 to 180° C., a composition comprising (B) a carbosiloxane dendrimer having a radically polymerizable organic group having the formula

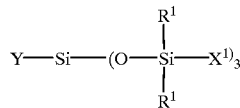

wherein Y is a radically polymerizable organic group, $R^1$ is $C_1$ to $C_{10}$ alkyl or aryl, $X^1$ is a silylalkyl group having the formula at i=1

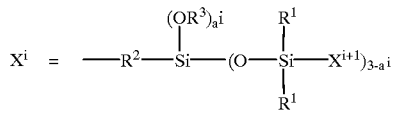

wherein $R^1$ is defined as above; $R^2$ is $C_2$ to $C_{10}$ alkylene; $R^3$ is $C_1$ to $C_{10}$ alkyl; $X^{i+1}$ is selected from the group consisting of a hydrogen atom, $C_1$ to $C_{10}$ alkyl, aryl, and a silylalkyl group; i is an integer with a value of 1 to 10; and $a^i$ is an integer from 0 to 3;

(C) a radical initiator; and (D) a solvent; and 2) dilution of the product of step 1) in water.

9. The method of claim 8, wherein the composition further comprises a compound selected from the group consisting of (A) a vinyl monomer and (E) a chain transfer agent.

10. The method of claim 9, wherein the composition comprises component (A) and the composition is heated under reduced pressure after step 1) and before step 2).

11. A method for treating solids, wherein the method comprises:

1) applying a water repellent onto a surface of a solid, wherein the water repellent comprises:

(i) a propellant gas, (ii) an organic solvent, and (iii) a pendant carbosiloxane dendrimer-functional vinyl-type polymer having a carbosiloxane dendrimer group with the formula

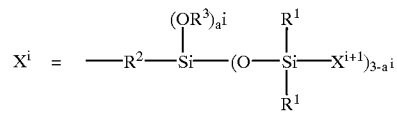

wherein Z is a divalent organic group, p is 0 or 1, $R^1$ is $C_1$ to $C_{10}$ alkyl or aryl, and $X^1$ is a silylalkyl group having the formula at i=1

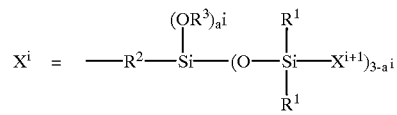

(wherein $R^1$ is defined as above; $R^2$ is $C_2$ to $C_{10}$ alkylene; $R^3$ is $C_1$ to $C_{10}$ alkyl; $X^{i+1}$ is selected from the group consisting of a hydrogen atom, $C_1$ to $C_{10}$ alkyl, aryl, and the silylalkyl group; i is an integer with a value from 1 to 10; and $a^i$ is an integer from 0 to 3); and 2) drying the solid.

12. The method of claim 11, wherein the solid is selected from the group consisting of fibers, sheet-form solids, foams, moldings, and particulates.

* * * * *